(12) United States Patent
Su et al.

(10) Patent No.: US 12,278,999 B2
(45) Date of Patent: Apr. 15, 2025

(54) GENERATION OF VIDEO STREAM HAVING LOCALIZED LIP-SYNCING WITH PERSONALIZED CHARACTERISTICS

(71) Applicant: International Business Machines Corporation, Armonk, NY (US)

(72) Inventors: Jun Su, Beijing (CN); Yang Liang, Beijing (CN); Luis Osvaldo Pizana, Austin, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/212,624

(22) Filed: Jun. 21, 2023

(65) Prior Publication Data

US 2024/0430497 A1 Dec. 26, 2024

(51) Int. Cl.
*H04N 21/2343* (2011.01)
*H04N 21/24* (2011.01)

(52) U.S. Cl.
CPC ..... *H04N 21/2343* (2013.01); *H04N 21/2402* (2013.01)

(58) Field of Classification Search
None
See application file for complete search history.

(56) References Cited

U.S. PATENT DOCUMENTS

| 7,613,613 | B2 | 11/2009 | Fields et al. |
| 8,655,152 | B2 | 2/2014 | Marks et al. |
| 9,372,852 | B2 | 6/2016 | Kim |
| 11,514,948 | B1 * | 11/2022 | Nair .................... G06F 16/2365 |

(Continued)

FOREIGN PATENT DOCUMENTS

| KR | 102306844 B1 | 9/2021 |
| WO | 2022110354 A1 | 6/2022 |
| WO | WO-2023137557 A1 * | 7/2023 ............. G06N 3/045 |

OTHER PUBLICATIONS

Prajwal et al., "Towards Automatic Face-to-Face Translation," arXiv, 2020, 9 pages, retrieved from https://arxiv.org/abs/2003.00418.

(Continued)

*Primary Examiner* — Omar S Parra
(74) *Attorney, Agent, or Firm* — Zilka-Kotab, P.C.

(57) ABSTRACT

A computer-implemented method, in accordance with one embodiment, includes detecting cultural context and accents of speakers portrayed in a video stream and/or an audience of the video stream. Accent tags are selected for the speakers according to the cultural context and accents of the speakers and/or the audience of the video stream. A textual representation of spoken words of the speakers is translated from a source language to a target language. The accent tags are applied to the textual representation of the spoken words in the target language according to the speakers corresponding to the textual representation of the spoken words in the target language. Speech lip movements of the speakers portrayed in the video stream are modified to match the target language and the locale accent tags. A translated video stream having the speakers appearing to speak in the target language with the modified lip movements is output.

20 Claims, 6 Drawing Sheets

(56) References Cited

U.S. PATENT DOCUMENTS

| | | | |
|---|---|---|---|
| 11,792,488 B2* | 10/2023 | Shao | G06F 40/58 725/37 |
| 2014/0053223 A1* | 2/2014 | Vorobyov | G10L 13/00 725/110 |
| 2018/0182375 A1* | 6/2018 | Fomin | G10L 15/005 |
| 2022/0215830 A1 | 7/2022 | Jawahar et al. | |
| 2023/0093405 A1 | 3/2023 | Santhar et al. | |
| 2023/0281466 A1* | 9/2023 | Bendale | G06F 16/9535 |

OTHER PUBLICATIONS

Prajwal et al., "A Lip Sync Expert Is All You Need for Speech to Lip Generation in the Wild," arXiv, Accepted in ACM Multimedia, 2020, 10 pages, retrieved from https://arxiv.org/abs/2008.10010.

Waibel et al., "Face-Dubbing++: Lip-Synchronous, Voice Preserving Translation of Videos," arXiv, 2022, 14, retrieved from https://arxiv.org/abs/2206.04523.

Ali et al., "Lip Syncing Method for Realistic Expressive 3D Face Model," LJMU Research Online, 2017, 59 pages.

Lahiri et al., "LipSync3D: Data-Efficient Learning of Personalized 3D Talking Faces from Video using Pose and Lighting Normalization," CVPR, 2021, pp. 2755-2764.

Jha et al., "Cross-language Speech Dependent Lip-synchronization," IEEE International Conference on Acoustics, Speech and Signal Processing (ICASSP), 2019, 5 pages, retrieved from https://www.semanticscholar.org/paper/Cross-language-Speech-Dependent-Lip-synchronization-Jha-Voleti/988b493ae494bdf9f31f39a448e47567ec6dcc34.

Suwajanakorn et al., "Synthesizing Obama: Learning Lip Sync from Audio," YouTube video, 2017, 3 pages, retrieved from https://www.youtube.com/watch?v=9Yq67CjDqvw.

IBM, "Watson Text to Speech," IBM, 2023, 8 pages, retrieved from https://www.ibm.com/cloud/watson-text-to-speech?utm_content=SRCWW&p1=Search&p4=43700069004798394&p5=e&gclid=EAlaIQobChMI952G8Zym-gIV2RXUAR1ZCw-dEAAYASAAEgIChPD_BwE&gclsrc=aw.ds.

Apple App Store, "Text to Speech!" Apple App Store Preview, 2023, 5 pages, retrieved from https://apps.apple.com/us/app/text-to-speech/id712104788.

Google, "Google Translate," Google, 2023, 1 page, retrieved from https://translate.google.com/.

Edmond, C., "This AI can create a video of Barack Obama saying anything," World Economic Forum, Jul. 21, 2017, 15 pages, retrieved from https://www.weforum.org/agenda/2017/07/obama-speech-simulation-washington-university/.

Sil, "ISO 639-3, 639 Identifier Documentation: cmn," SIL International, 2023, 3 pages, retrieved from https://iso639-3.sil.org/code/cmn.

Phillips, A., "Understanding the New Language Tags," W3C Internationalization, May 15, 2006, 12 pages, retrieved from https://www.w3.org/International/articles/bcp47/.

Wikimedia, "Module:Language/data/ISO 639-3," Wikimedia, May 2022, 111 pages, retrieved from https://meta.wikimedia.org/wiki/Module:Language/data/ISO_639-3.

Reallusion, "Lipsync Animation," Reallusion, 2023, 9 pages, retrieved from https://www.reallusion.com/iclone/lipsync-animation.html.

\* cited by examiner

GENERATION OF VIDEO STREAM HAVING LOCALIZED LIP-SYNCING WITH PERSONALIZED CHARACTERISTICS

BACKGROUND

The present invention relates to intelligent localized lip-syncing, and more specifically, this invention relates to generating a translated video stream having the speakers speaking in a target language with modified lip movements corresponding to the target language and a selected accent.

Lip-syncing is the process of matching the movement of a person's lips with recorded speech or music. The audio and the visual aspects of lip-synced videos almost always do not match, meaning that the lips are moving out of sync with the audio. Thus, lip-synced videos, especially after translation to a language other than the original language, almost never appear lifelike. This lack of correlation between lip movement and the words spoken tends to render lip-synced videos harder to understand, even if the translated audio is in the native language of the viewer.

Lip reading, also known as speechreading, is the ability to understand spoken language by observing a speaker's lip movements, facial expressions, and gestures. Lip reading is an important communication skills for people who are deaf or hard of hearing, as well as those who may have difficulty processing auditory information. Lip reading can be crucial in situations where it is difficult to hear or understand speech, such as in noisy environments, or when the speaker has a heavy accent or a speech impediment.

SUMMARY

A computer-implemented method, in accordance with one embodiment, includes detecting cultural context and accents of speakers portrayed in a video stream and/or an audience of the video stream. Accent tags are selected for the speakers according to the cultural context and accents of the speakers and/or the audience of the video stream. A textual representation of spoken words of the speakers is translated from a source language to a target language. The accent tags are applied to the textual representation of the spoken words in the target language according to the speakers corresponding to the textual representation of the spoken words in the target language. Speech lip movements of the speakers portrayed in the video stream are modified to match the target language and the locale accent tags. A translated video stream having the speakers appearing to speak in the target language with the modified lip movements is output.

A computer-implemented method, in accordance with another embodiment, includes selecting an accent associated with a first user. A video stream is processed for rendering lip movements onto a speaker portrayed in the video stream, the lip movements corresponding to the selected accent. The processed video stream is output to the first user.

A computer program product for generating a translated video stream, in accordance with another embodiment, includes one or more computer readable storage media, and program instructions collectively stored on the one or more computer readable storage media. The program instructions include program instructions to perform any of the foregoing methods.

A system, in accordance with another embodiment, includes a processor, and logic integrated with the processor, executable by the processor, or integrated with and executable by the processor, the logic being configured to perform any of the foregoing methods.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for generating a translated video stream having the speakers speaking in a target language with modified lip movements corresponding to the target language and a selected accent.

In one general embodiment, a computer-implemented method includes detecting cultural context and accents of speakers portrayed in a video stream and/or an audience of the video stream. Accent tags are selected for the speakers according to the cultural context and accents of the speakers and/or the audience of the video stream. A textual representation of spoken words of the speakers is translated from a source language to a target language. The accent tags are applied to the textual representation of the spoken words in the target language according to the speakers corresponding to the textual representation of the spoken words in the target language. Speech lip movements of the speakers portrayed in the video stream are modified to match the target language and the locale accent tags. A translated video stream having the speakers appearing to speak in the target language with the modified lip movements is output.

In another general embodiment, a computer-implemented method includes selecting an accent associated with a first user. A video stream is processed for rendering lip movements onto a speaker portrayed in the video stream, the lip movements corresponding to the selected accent. The processed video stream is output to the first user.

In yet another general embodiment, a computer program product for generating a translated video stream includes one or more computer readable storage media, and program instructions collectively stored on the one or more computer readable storage media. The program instructions include program instructions to perform any of the foregoing methods.

In yet another general embodiment, a system includes a processor, and logic integrated with the processor, executable by the processor, or integrated with and executable by the processor, the logic being configured to perform any of the foregoing methods.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
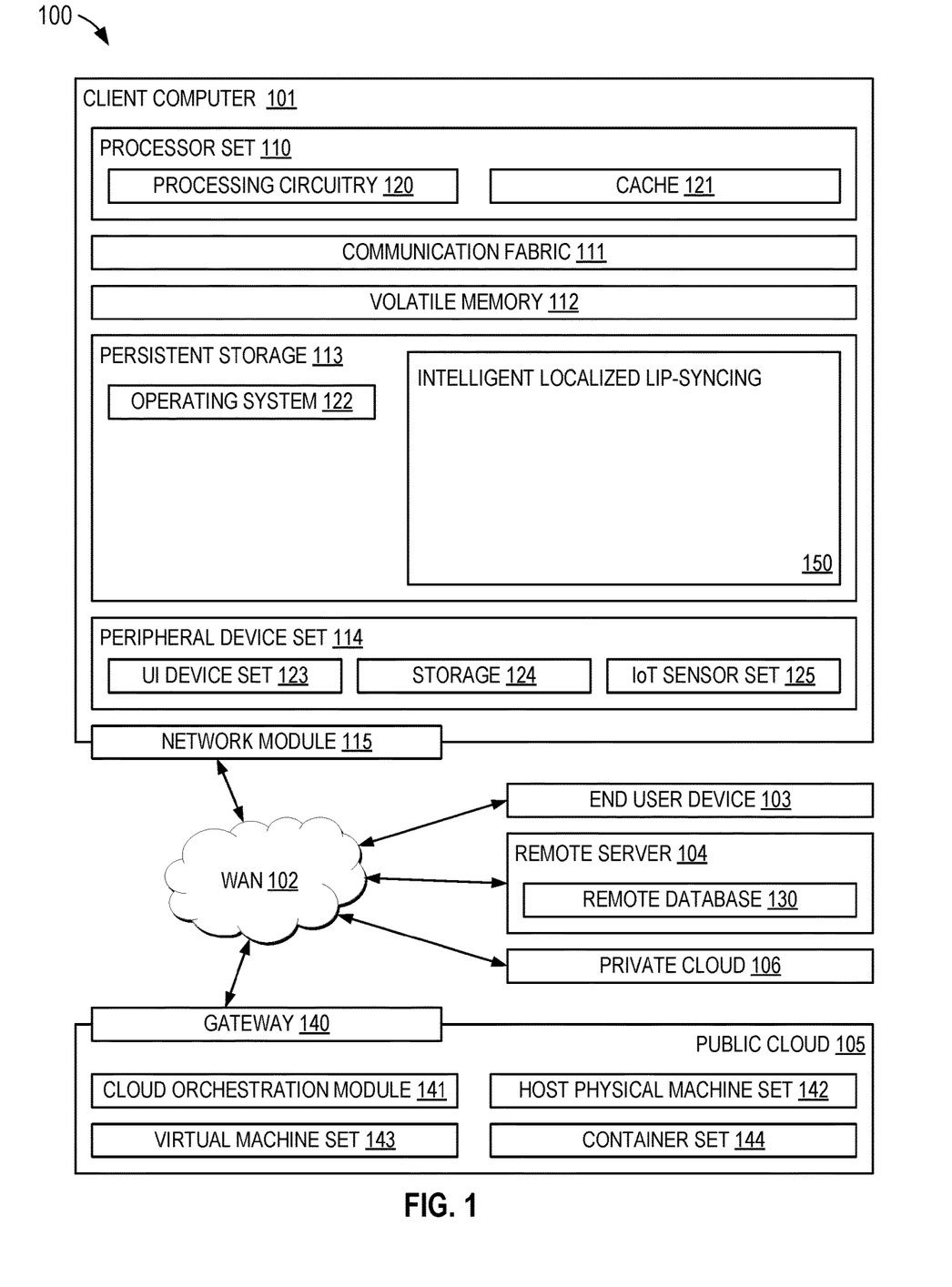
FIG. 1 is a diagram of a computing environment, in accordance with one embodiment of the present invention.

Computing environment 100 contains an example of an environment for the execution of at least some of the computer code involved in performing the inventive methods, such as code for intelligent localized lip-syncing in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, lip-syncing is the process of matching the movement of a person's lips with recorded speech or music in a video stream. The audio and the visual aspects of lip-synced videos almost always do not match, meaning that the lips are moving out of sync with the audio. Thus, lip-synced videos, especially after translation to a language other than the original language, almost never appear lifelike. This lack of correlation between lip movement and the words spoken tends to render lip-synced videos harder to understand, even if the translated audio is in the native language of the viewer.

Moreover, in modern translated movies and video streams, the translated audible speech may not reflect the original speakers' (e.g., actors', narrators', performers', etc.) speech accents and roles within a cultural background. For example, consider an English movie originally recorded with conversations in English between an English character (with a British accent) and his Russian spouse (with a Russian accent). The translation of the audio from English to Chinese language has heretofore resulted in the translated Chinese not having an English accent for the English character in the translated-to-Chinese speech of the English character, nor a Russian accent for the spouse in the translated-to-Chinese speech of the spouse. Moreover, the lip movements may reflect the original English speech, rather than the translated-to-Chinese speech, much less speech in the respective accents of the aforementioned spouses.

In another example, consider a historical movie such as Gladiator, which takes place in Rome. For historical accuracy, the audible speech of the characters may be translated to Latin to match the historical accuracy. Ideally, the lip movements would match the Latin language. Moreover, to please Italian viewers who may wish to watch the movie in Italian now that Italian is spoken in Rome, the translated-to-Italian speech of the actors would ideally be presented with a Roman accent and lip movements reflecting the accent. However, this has heretofore not been possible.

Presented in detail below are techniques for intelligent localized lip-syncing based on speech characteristics of the speakers in the video stream and/or viewers of the video stream, and/or based on background culture. The techniques presented below are particularly useful for making lip movements of a speaker, in a video stream having audible speech translated to another language (e.g., by dubbing in audio in the other language), be more true to the accents and/or cultures of the speakers and/or viewers.

The methodology presented herein is useful not only in its ability to provide a modified video stream that is more realistic in view of proper accents and background culture, but it can also help people with hearing loss to follow conversations, especially in situations where assistive devices such as hearing aids or cochlear implants are not sufficient.

Lip reading can improve communication and social interaction for people with hearing loss, as well as enhance their educational and employment opportunities. It can also improve safety, as lip reading can help people to better understand instructions and warnings in emergency situations.

It can be difficult to read the lips of a speaker with an accent or dialect because their pronunciation and mouth movements may be different from what the reader is used to seeing. This can make it harder for a person with hearing loss to distinguish between different sounds and words, especially if the accent or dialect is unfamiliar to them.

Accents and dialects can also affect the rhythm and intonation of speech, which can make it more challenging to follow the flow of the conversation. For example, some accents may emphasize certain syllables or words, while others may have a faster or slower pace of speech in different languages.

Additionally, lip reading requires not only observing the speaker's lips but also their facial expressions, gestures, and context. If the speaker is using idiomatic expressions or cultural references that are unfamiliar to a listener, it may be harder to understand the message being conveyed.

Lip reading can certainly be more challenging when the speaker has a different accent or dialect, as the mouth movements and pronunciation patterns may be different from what the listener is used to seeing. For instance, two people may communicate with each other without any problems, but they may not be able to understand strangers' speeches with different accents solely because they are not familiar with the strangers' lip movements.

Figure 2:
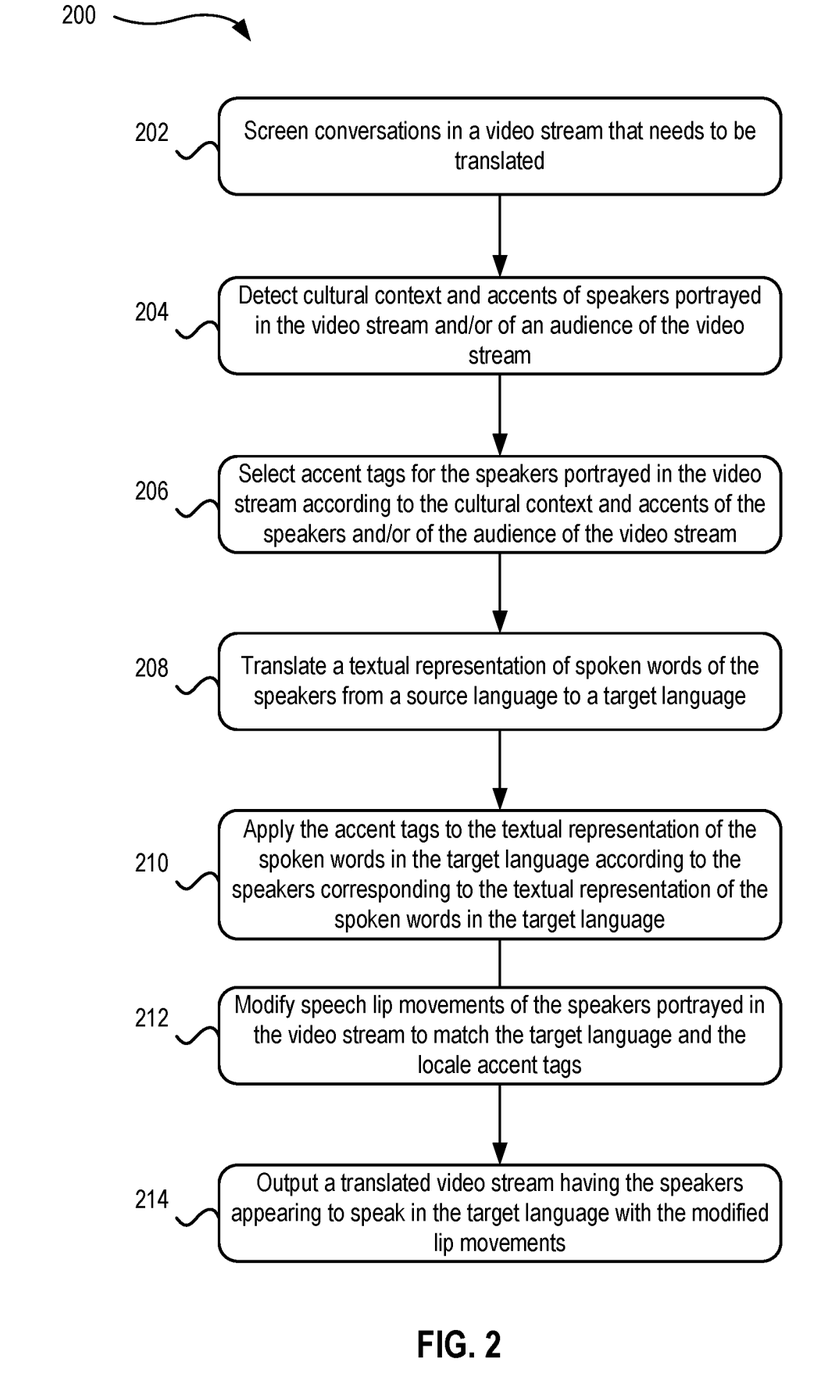
FIG. 2 is a flow diagram of a method, in accordance with one embodiment of the present invention.

Now referring to FIG. 2, a flowchart of a method 200 is shown according to one embodiment. The method 200 may be performed in accordance with the present invention in any of the environments depicted in FIG. 1, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, in which all conversation in a given video stream that needs to be translated are screened. Any technique for identifying such conversations that would become apparent to one skilled in the art after reading the present disclosure may be used.

In operation 204, cultural context and accents of speakers portrayed in the video stream and/or of an audience of the video stream are detected. Accordingly, in one approach, the cultural context and accents of the original performers in the conversation are determined. The cultural context and/or accents of the original performers can be surmised based on contextual information about the video stream, such as description of the video stream (e.g., movie synopsis, information from a database describing characteristics of the video production and its characters), description of the characters, cultural and/or accent labeling found in the contextual information or embedded in the video stream, etc. In another approach, artificial intelligence using a trained machine learning model may be used to detect the distinct conversations in the audio portion of the video stream and analyze each conversation to determine cultural context and/or accent of each speaker. And yet another approach, the transcription of the conversations, such as closed captioning, may be analyzed using artificial intelligence to detect the cultural context.

Accordingly, the cultural context and or accent of the speakers in the video stream may be used to further tailor the lip-syncing to be more true to the culture of the speakers and/or locations in the video stream, and moreover the proper accents may be applied to the lip-syncing. Thus, for example, an English movie set in England and having conversations in English between an English character (with an English accent) and his Russian spouse (with a Russian accent) may be analyzed, and the conversations may be determined to have a British cultural context. Thus, the proper accents used by the actors in the movie in its original language are detected.

In another approach, the cultural context and/or accent of a viewer of the video stream may be detected, with permission of the viewer, e.g., to enable tailoring of lip movement to be more like that of the viewer. This in turn may help people who read lips to better understand the conversations in the translated audio conversation in the video stream. For example, a user profile created by the viewer may be consulted to determine cultural and/or accent information about the viewer. In another approach, cultural context and/or an accent may be estimated based on a destination location of the video stream, e.g., a New York accent may be selected based on the video stream being delivered for viewing in New York.

In operation 206, accent tags are selected for the speakers portrayed in the video stream according to the cultural context and accents of the speakers and/or of the audience of the video stream detected in operation 204. The accent tags may be any data object that reflects a particular accent. For example, an accent tag may be a value found in a table correlating accent tag values with corresponding accent and/or cultural context values. Accent tags described herein are also referred to as locale accent tags.

In a preferred approach, standardized language tags are used. ISO 639-3 defines language tags which are enclosed by Macro Languages. For instance, Mandarin Chinese (a spoken variation) is identified by the ISO 639-3 code 'cmn' and rules require that code, when used as a subtag, to always appear with its macrolanguage "zh" (Chinese). Thus, an accent tag selected for Mandarin Chinese may be zh_cmn-CN. An accent tag selected for a speaker having a New York accent may be en-x-New York. Using the ISO 639-3 language tags, or the like, content in a particular macro language may be accurately tagged to reflect a particular accent.

In operation 208, a textual representation of spoken words of the speakers is translated from a source language to a target language. In one approach, translating the textual representation of the spoken words of the speakers includes translating conversation subtitles in the source language to the target language. For example, existing closed captioning text of speech in the source language may be translated to the target language. Such closed captioning text may be embedded in the video stream.

In another approach, a speech to text transcriber of known type may be used. Examples of text transcribers include Watson Text to Speech from International Business Machines Corporation, Google Translate, etc.

In operation 210, the accent tags are applied to the textual representation of the spoken words in the target language according to the speakers corresponding to the textual representation of the spoken words in the target language. For instance, the translated text may be tagged with the accent tags. Thus, for example, the text corresponding to a speaker speaking English in a New York accent may be tagged with en-x-NewYork, while the text corresponding to a speaker speaking in English in a Russian accent may be tagged with en-x-Russia.

In operation 212, speech lip movements of the speakers portrayed in the video stream are modified to match the target language and the locale accent tags.

Ideally, the shape of the mouth of a speaker is changed, e.g., via computer generated imagery (CGI), so that the mouth and lips appear to deliver the newly recorded language rather than the original one, thereby making it appear as if that actor or character is speaking a different language (e.g., English) rather than the language that was recorded when the movie was originally made (e.g., Spanish). Known techniques for modifying the mouths of speakers in the film may be employed. One example of such technique is found in U.S. Pat. No. 8,655,152 to Marks et al., which describes a process for presenting live action foreign language feature films in a native language by replacing the physical mouth positions of the original actors to match a newly recorded audio track in a different language with the original and/or replacement actors keeping the essence of the original dialect, while achieving the illusion that the content was originally filmed in the new voice over language. Another technique that may be utilized is that found in U.S. Pat. No. 7,613,613 to Fields et al., which describes a technique for presenting lip-synchronized speech corresponding to text received in real time, such as by generating lip-synchronized images based on phonemes generated from the text and based on identified expressions. These are merely provided as examples, and any technique known in the art may be used.

In operation 214, a translated video stream having the speakers appearing to speak in the target language with the modified lip movements is output.

In one approach, generating the translated video stream includes converting the translated textual representation, now in the target language, to speech in the target language, the speech having an accent corresponding to the accent tags applied to the textual representation in the target language. For example, Watson Text to Speech from International Business Machines Corporation may be applied using a specially trained model to convert the original text, or the translated text, to natural-sounding audio in the target language, with accents in the audible speech corresponding to the accent tags applied to the corresponding text.

In another approach, the audio in the target language may be generated in real time from the source audio portion of the video stream using a language converter of known type, a text to speech engine, etc.

In yet another approach, the audio portion of the video stream may be a dubbed-in recording in the target language, e.g., from voice actors speaking in the target language.

In some embodiments, the method is performed in real time to output the translated video stream having the speakers speaking in the target language with the modified lip movements while receiving the video stream from a source.

In one embodiment, the translated video stream having the speakers appearing to speak in the target language with the modified lip movements is output to a first user, and the target language is selected based on a user profile of the first user. For example, the user profile may specify a language preference for the first user. The user profile may also specify a preferred accent to apply to the target language audio and/or lip-syncing.

Likewise, the method 200 may be performed for a second user for generating a second translated video stream having the speakers appearing to speak in a second target language that is different than the target language and the source language. The second target language may be selected based on a user profile of the second user.

In some embodiments, the method 200 is performed in real time to output translated video streams in many target languages simultaneously, with the processing occurring while the video stream is being received from a source. Embodiments such as this are particularly useful for things like video conferencing where participants' voices are translated in real time for presentation to other participants in the native languages of the other participants.

In various embodiments, an option to opt in or out of the modifications of the audio and/or lip-syncing to reflect accents may be presented to the viewer. For example, the viewer may be able to select a setting in the viewer's user profile specifying whether the accent modifications should be applied. Similarly, a streaming device may provide the option to receive video streams with or without accent modifications.

Figure 3:
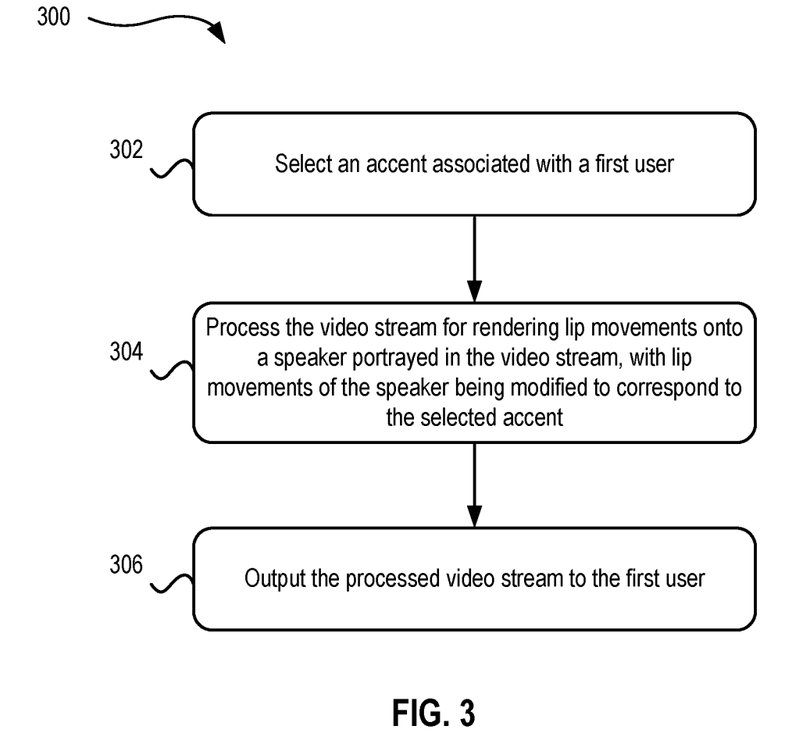
FIG. 3 is a flow diagram of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an accent associated with a first user is selected. The first user is a viewer of a video stream, such as a movie or television program, a live video conference, etc.

In one approach, the accent is selected automatically based on a physical location of the first user, e.g., as determined by input from the user, a profile created by the user, a detected destination of the video stream, etc. For example, if the first user has entered his or her location as Spain during a video conference with an English-speaking user located in the United States, the target language may be selected as Spanish, and the accent to apply to the language and/or lip-syncing may be Castilian.

In another approach, the accent is selected based on a selection previously defined by the first user, e.g., as specified in the user's profile, etc.

Other operations may be performed, such as any of those listed elsewhere herein, such as creating a translated audio portion in the target language of the first user, generation of modified mouth/lip movements corresponding to the selected accent, etc.

In operation 304, the video stream is processed for rendering lip movements onto a speaker (e.g., the English-speaking user) portrayed in the video stream, with lip movements of the speaker being modified to correspond to the selected accent.

The processing may be performed prior to streaming the video stream, performed in real time as the video stream is streamed to the first user, etc. For example, when the processing is performed in real time, an audio portion of the video stream may be modified in real time to apply the selected accent to a voice of the speaker. The processing may include translating a voice of the speaker to a target language, e.g., the language selected for the first user.

In operation 306, the processed video stream is output to the first user.

The method 300 may be performed for other users, sequentially, simultaneously, etc. Thus, a second instance of the same video stream may be processed for rendering second lip movements onto the speaker, the second lip movements corresponding to a second accent associated with a second user, the second accent being different than the accent. The processed second instance of the video stream is output to the second user.

Referring to FIGS. 2 and 3, in some embodiments, a computer (e.g., personal computer; mobile device; streaming device such as a set-top box, cable box, etc.) of the viewer may perform any of the methodology presented herein, e.g., to apply the accent modifications at the viewer's location. For example, the computer of a participant in a videoconference may convert the incoming video stream to a translated version in the participant's selected language, and with accents applied to the language and/or lip-syncing. In other embodiments, some or all of the methodology may be performed at a location remote from the viewer, e.g., in the cloud, at a streaming service provider's site, etc.

Figure 4:
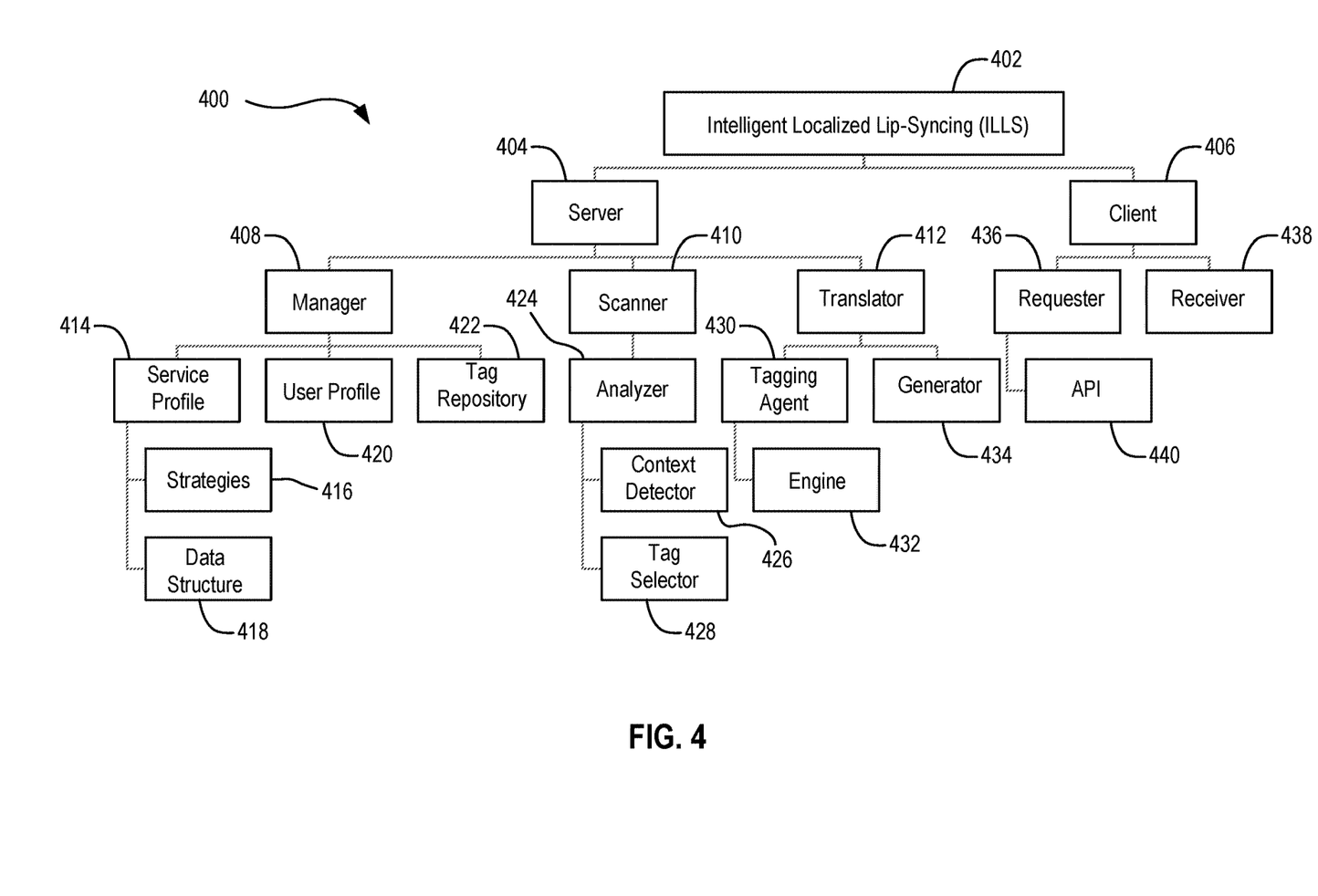
FIG. 4 is a chart depicting several exemplary components of an architecture for intelligent localized lip-syncing, in accordance with one embodiment.

FIG. 4 depicts several exemplary components of an architecture 400 for performing the methodology presented herein, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

The modules of the architecture 400 may be implemented in or by any suitable component of the operating environment. For example, in various embodiments, the hardware modules and functional modules may be partially or entirely embodied as or performed by a computer, or some other device having one or more processors therein. The processor, e.g., processing circuit(s), chip(s), and/or module(s) implemented in hardware and/or software, and preferably having at least one hardware component, may be utilized in any device to perform the respective function. Illustrative processors include, but are not limited to, a central processing unit (CPU), an application specific integrated circuit (ASIC), a field programmable gate array (FPGA), etc., combinations thereof, or any other suitable computing device known in the art.

As shown, the Intelligent Localized Lip-Syncing (ILLS) service 402 includes a server 404. The server 404 is in communication with a client 406, which is typically on the viewer side. The server 404 runs or is in communication with a manager 408, a scanner 410, and a translator module 412.

The manager 408 includes or is in communication with a service profile module 414 that includes profile information about how the translation and modification of lip movements is performed. A strategies submodule 416 may include strategies for selecting the proper accents and lip movements based on accent tags, cultural context, etc. The service profile module 414 may include a data structure submodule 418 that allows an administrator to add or remove attributes of the ILLS service 402, etc.

The manager 408 may also include a user profile module 420 for storing user profiles of viewers, actors, etc.

The manager 408 may also include a tag repository 422 that stores, for example, the locale accent tags for one or preferably multiple languages. The tag repository 422 may also include mapping information for assisting in using the tags for particular languages, including different accents in the same language, e.g., a New York accent in English and a Texan accent in English.

The scanner module 410 performs the scanning function for screening all conversation in a given video stream that needs to be translated. The scanner module 410 may include an analyzer module 424 that analyzes the cultural context and personal characteristics of each role in the conversation via the context detector submodule 426. For instance, the context detector submodule 426 may detect the cultural context and accents (en-x-New York, zh_cmn-CN, etc.) of the original performers and/or audience. A tag selector submodule 428 selects the correct locale accent tags for the speech according the detected cultural context and accents of the original performers and/or audience.

The translator module 412 translates a textual representation (e.g., subtitles) of each conversation from the source language to the target language, e.g., using machine translation as needed. A tagging agent 430 tags the translated conversation subtitles by using the selected locale accent tags. The engine submodule 432 uses a customized lip-syncing engine to modify the speech lip movement for matching the translated contents with the tagged cultural context and accents. The generator module 434 generates a translated video stream with new and/or modified speech lip movements.

On the client side, the client 406 includes or is in communication with a requester module 436 and a receiver module 438. The requester module 436 manages requests for translated/lip-synced video streams. An appropriate API 440 to the user's device may be used. The receiver module 438 receives the video stream. Note that in various embodiments, the client 406 may be a software module running on a viewer's computer or mobile device, a plugin for a media player, etc.

Figure 5:
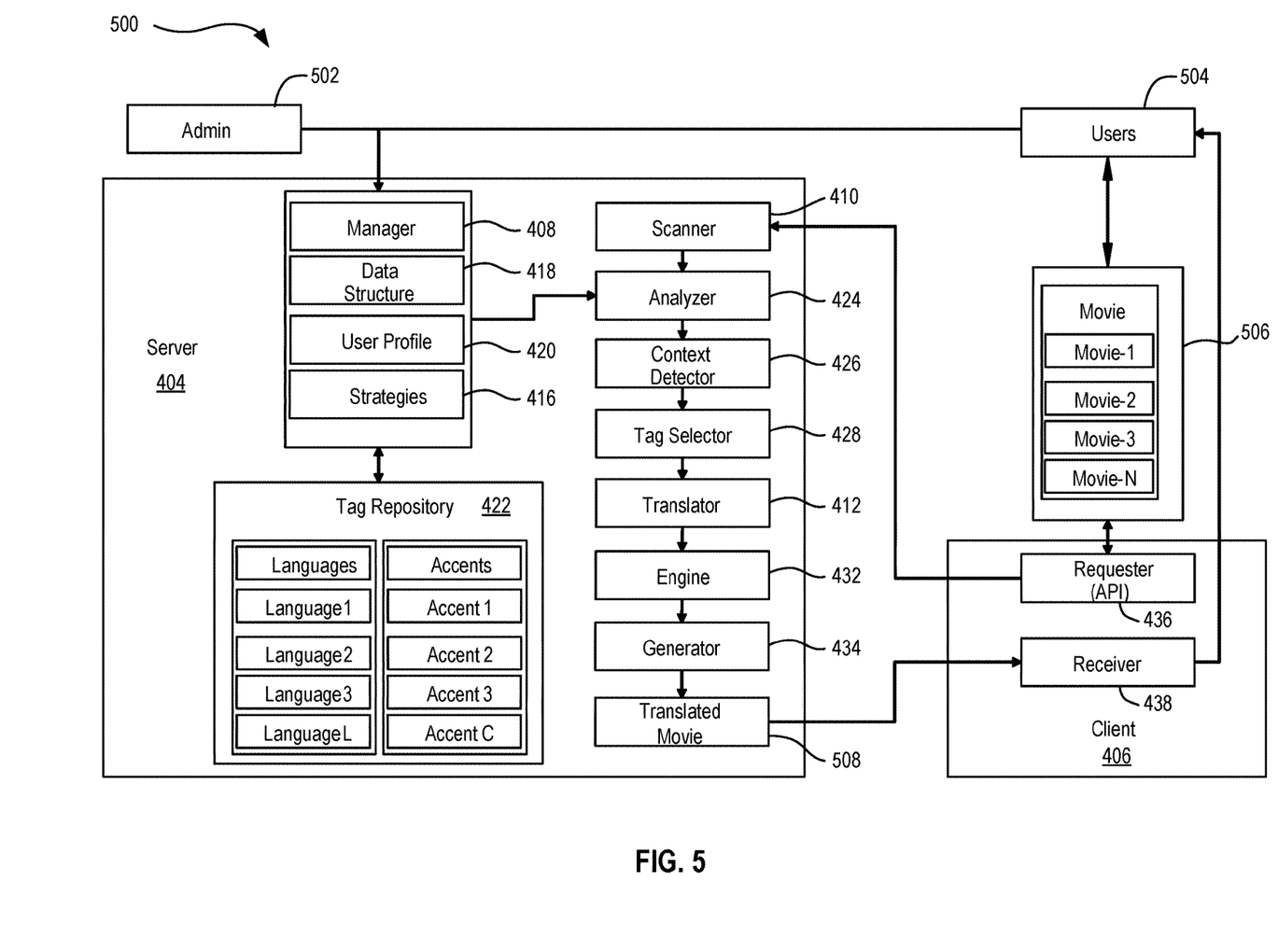
FIG. 5 is a flow diagram depicting how data flows between the modules of FIG. 4, in accordance with one embodiment.

FIG. 5 is a flow diagram 500 depicting how data flows between the modules of FIG. 4, in accordance with one embodiment. As shown, an administrator 502 such as a service provider, etc. may communicate with both users (viewers) 504 and the server 404. For example, the manager module 408 may receive, directly or via the administrator 502, requests from the users to provide translated content from a list 506 of available content. The manager module 408 may initiate creation of a translated video stream with proper and/or desired accents in the translated audio and/or in the lip-syncing depicted on the speakers in the translated video stream. Modules 416-422 and their functionality as described above, may be used. As represented in FIG. 5, the tag repository module 422 may include many languages and one or more accents for each language.

The requester module 436 of the client 406 may send a request to the server 404 for a video stream in a particular language, perhaps with a request for particular accent(s) in the translated audio and/or in the lip-syncing, etc. Modules 410, 424, 426, 426, 412, 432 434 operate as described above to create a translated movie 508. The translated movie 508 is provided to the receiver module 438 on the client side for output to the user.

Figure 6:
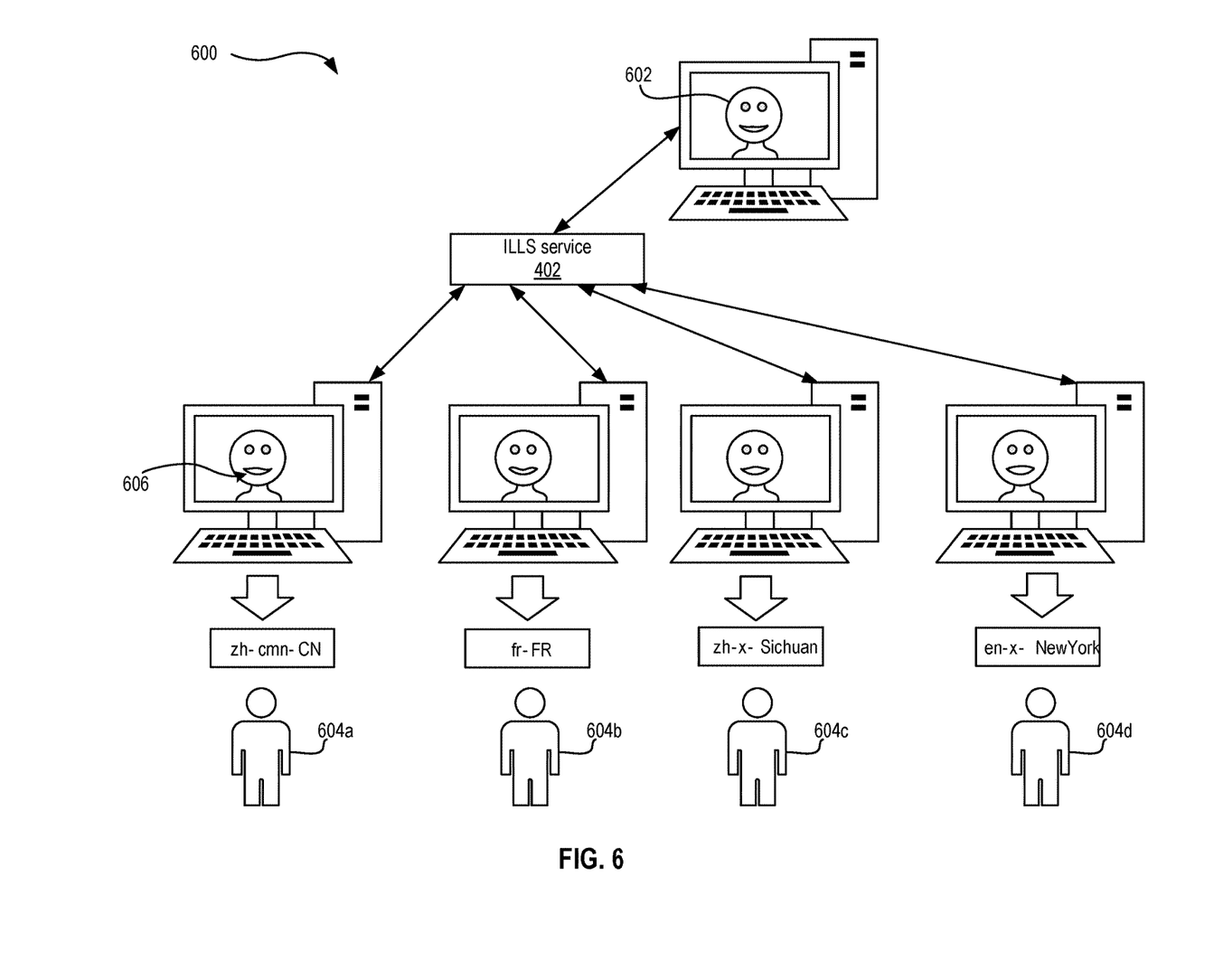
FIG. 6 is a graphical representation of a real time service providing a video stream from a presenter to multiple viewers with translated audio and lip movements according to particular accents, in accordance with one embodiment.

FIG. 6 is a graphical representation 600 of a real time service providing a video stream from a presenter 602 to multiple viewers 604a-604d with translated audio and lip movements according to particular accents. As shown, the presented 602 speaks in the presenter's native language, which is English with a British accent in this example. The ILLS service 402 translates the video stream to the desired language determined for each of the viewers 604a-604d, e.g., according to information provided by the viewers 604a-604d during acceptance of the conference invitation, according to a user profile created by each user providing cultural context information about the user and/or specifying a preferred accent, etc. Moreover, the ILLS service 402 modifies the lip movements of the presenter to reflect an accent desired by the particular viewer, e.g., based on locale accent tagging applied to speech-to-text output in real-time, where the tagging is selected based on the user profile or selected accent. Accordingly, viewer 604a receives a video stream with the speech translated to Chinese and the accent depicted on the lips 606 of the presenter modified to reflect a Mandarin accent. Viewer 604b receives a video stream with the speech translated to French and the accent depicted on the lips 606 of the presenter modified to reflect a France-French accent. Viewer 604c receives a video stream with the speech translated to Chinese and the accent depicted on the lips 606 of the presenter modified to reflect a Sichuan accent. Viewer 604d receives a video stream with the speech still in English, but modified to reflect a New York accent in the speech and depicted on the lips 606 of the presenter.

The methodology presented herein provides many beneficial features. For example, regarding accessibility, translating movies into different languages through lip-syncing can make them accessible to a broader audience who may not understand the original language. This can help to spread cultural knowledge and understanding across different regions of the world.

Cultural sensitivity may also be promoted. By lip-syncing translated dialogue, a film's original language and cultural nuances can be preserved, while ensuring the translated version is accurate and culturally sensitive to the target audience.

Lip-syncing is a cost-effective method of translating movies, as it avoids the need for re-recording dialogue or creating new dubs. This can help to reduce production costs and save time.

Lip-syncing can also help to maintain the aesthetic and emotional qualities of the original performance, such as the tone, intonation, and emotional delivery of the actor's performance, which may be lost in a dubbed version.

The methodology may also enable preservation of original content. Lip-syncing translations may preserve the original audio and dialogue, which is important for archival purposes, as well as for fans of the original work who may prefer to watch the film in its original language.

The modified video streams described herein may be used for presenting movies and television programming, video conferencing, playback for town halls, etc. in other languages.

A converted playback can help the original speaker to prepare for delivering the same speech or message in another language. For example, the speaker may review a speech created in English, but modified to be in Spanish or Portuguese, in preparation for live delivery of the speech in those regions.

Stockholders and investors can now view company messaging in the language of their preference, which provides confidence in the company and stability to the stock market.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting cultural context and accents of speakers portrayed in a video stream, the speakers speaking a source language, a first of the speakers having an accent when speaking in the source language that is different than an accent of a second of the speakers when the second speaker is speaking in the source language;
    selecting accent tags for the speakers according to the detected cultural context and accents of the speakers, wherein the accent tags include data objects identifying the source language and the accent of the respective speaker;
    translating a textual representation of spoken words of the speakers from the source language to a target language;
    applying the accent tags to the textual representation of the spoken words in the target language according to the speakers corresponding to the textual representation of the spoken words in the target language;
    modifying speech lip movements of the speakers portrayed in the video stream to match speech lip movements characteristic of the target language and speech lip movements characteristic of the accents of the speakers according to the applied accent tags; and
    outputting a translated video stream having the speakers appearing to speak in the target language with the modified lip movements and to speak in the target language with the respective accents corresponding to the source language according to the applied accent tags.

2. The computer-implemented method of claim 1, wherein translating the textual representation of the spoken words of the speakers includes translating conversation subtitles in the source language to the target language.

3. The computer-implemented method of claim 1, wherein generating the translated video stream includes converting the textual representation in the target language to speech in the target language, the speech being further modified to reflect an accent corresponding to the accent tags applied to the textual representation in the target language.

4. The computer-implemented method of claim 1, wherein the modified lip movements are based on mapping information stored in a tag repository, the mapping information assisting in using the accent tags for different accents in the same language.

5. The computer-implemented method of claim 1, wherein the translated video stream having the speakers appearing to speak in the target language with the modified lip movements is output to a first user, wherein the target language is selected based on a user profile of the first user, wherein the user profile specifies a preferred accent to apply to audio being output in the target language and/or to the lip movements being output in the translated video stream.

6. The computer-implemented method of claim 5, comprising performing the method for a second user for generating a second translated video stream having the speakers appearing to speak in a second target language that is different than the target language and the source language, wherein the second target language is selected based on a user profile of the second user.

7. The computer-implemented method of claim 6, wherein the method is performed in real time to output the translated video streams while receiving the video stream from a source.

8. The computer-implemented method of claim 1, further comprising determining the source language being spoken by the speakers, wherein the accents of the speakers portrayed in the video stream are particular accents within the source language, the accents corresponding to how the speakers sound in the source language in terms of at least one characteristic selected from the group consisting of: rhythm of speech, intonation of speech, emphasis of certain syllables, and emphasis of certain words, wherein the accent tags are selected for the speakers according to the cultural context and the detected accents of the speakers of the video stream.

9. The computer-implemented method of claim 1, wherein the accent tags are selected for the speakers according to the cultural context and accents of an audience of the video stream.

10. A computer program product for generating a translated video stream, the computer program product comprising:
one or more computer readable storage media, and program instructions collectively stored on the one or more computer readable storage media, the program instructions comprising:
program instructions to perform the method of claim 1.

11. A system, comprising:
a processor; and
logic integrated with the processor, executable by the processor, or integrated with and executable by the processor, the logic being configured to perform the method of claim 1.

12. A computer-implemented method, comprising:
selecting a target language associated with a first user;
selecting an accent within the selected target language that is associated with the first user;
processing a video stream for rendering lip movements onto a speaker portrayed in the video stream, the lip movements corresponding to the target language, the lip movements further corresponding to the selected accent associated with the first user; and
outputting the processed video stream to the first user.

13. The computer-implemented method of claim 12, wherein the accent is selected based on a physical location of the first user.

14. The computer-implemented method of claim 12, wherein the accent is selected based on a selection previously defined by the first user.

15. The computer-implemented method of claim 12, comprising processing the video stream to convert an audio portion of the video stream from a source language to the target language, wherein the accent associated with the first user is applied to the audio portion to apply the selected accent to a voice of the speaker, wherein the processed video stream is streamed to the first user for output of the processed video stream.

16. The computer-implemented method of claim 12, comprising modifying an audio portion of the video stream in real time to apply the selected accent to a voice of the speaker.

17. The computer-implemented method of claim 16, wherein the processing includes translating a voice of the speaker to the target language, the target language being different than a source language spoken by the speaker; and further comprising: processing a second instance of the video stream for translating a voice of the speaker to the target language and rendering second lip movements onto the speaker that are different than the lip movements, the second lip movements corresponding to a second accent associated with a second user, the second accent being an accent in the target language that is different than the accent associated with the first user in the target language; and outputting the processed second instance of the video stream to the second user.

18. The computer-implemented method of claim 12, wherein a source language spoken by the speaker in the video stream is the same as the target language, wherein the processed video stream is output to the first user in the source language, wherein an accent associated with the speaker in the source language is different than the accent associated with the first user.

19. A computer program product for generating a translated video stream, the computer program product comprising:
one or more computer readable storage media, and program instructions collectively stored on the one or more computer readable storage media, the program instructions comprising:
program instructions to perform the method of claim 12.

20. A system, comprising:
a processor; and
logic integrated with the processor, executable by the processor, or integrated with and executable by the processor, the logic being configured to perform the method of claim 12.

* * * * *